May 8, 1934.   H. C. STEPHENS   1,958,399
REAMER FOR CITRUS FRUITS
Filed June 3, 1932
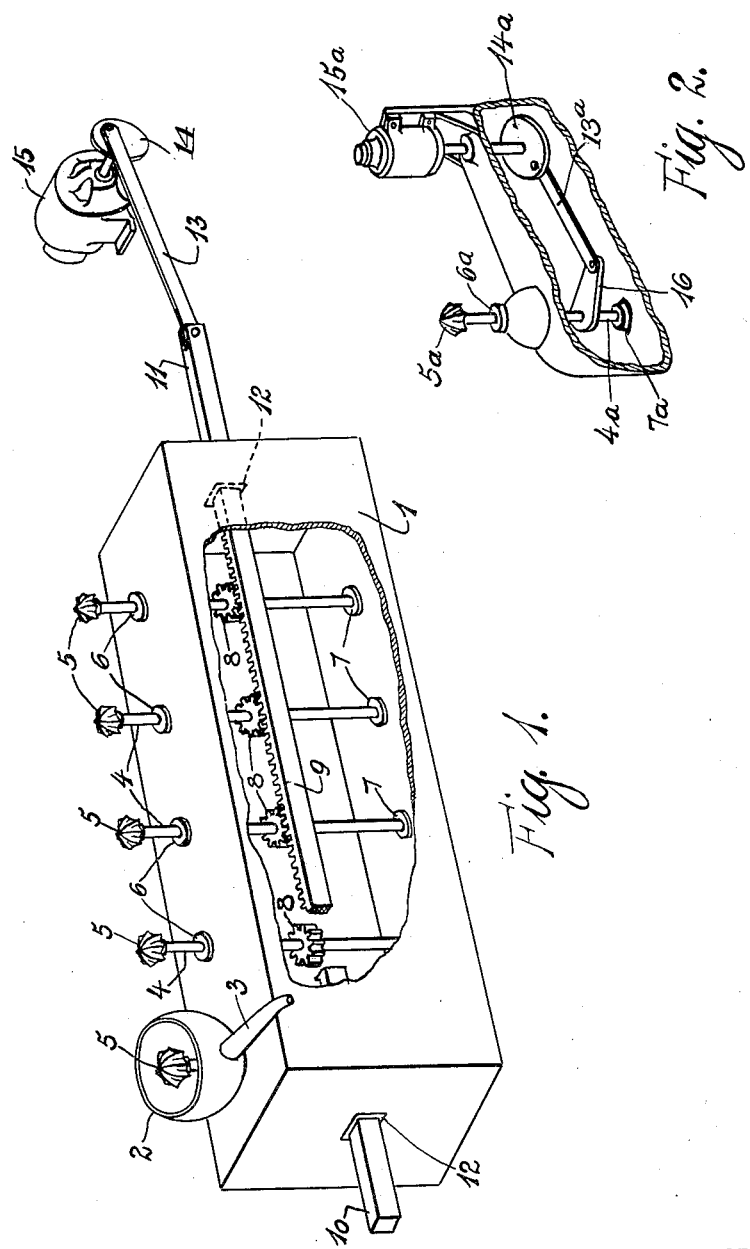
INVENTOR:
Henry C. Stephens
BY
Roger Sherman Hoar
ATTORNEY.

Patented May 8, 1934

1,958,399

UNITED STATES PATENT OFFICE 1,958,399

REAMER FOR CITRUS FRUITS

Henry C. Stephens, Ontario, Calif., assignor, by mesne assignments, to Natural Food Products Company, Orange, Calif., a corporation of California Application June 3, 1932, Serial No. 615,071

5 Claims. (Cl. 146—3)

My invention relates to power-driven reamers for citrus fruit.

Heretofore there have been two principal methods of extracting the juice from citrus fruit. Both, and indeed my own method, involve first slicing the fruit into two hemispheres. Then, in one method, each hemisphere is squeezed between a concave element and a convex element. But this has the disadvantage of extracting and mingling with the juice some of the bitter oils in the rind.

The other method involves revolving a reamer-head within the hemisphere. But this has the disadvantage of extracting and mingling with the juice large quantities of pulp and albido. And, in the case of commercial power-driven reamers, there is a further disadvantage which arises out of the high speed at which such reamers have to be driven in order to produce the maximum of juice in the minimum of time. This further disadvantage is that of requiring an undue high degree of skill on the part of the operators. For, if the hemisphere of fruit is pressed down too firmly, not only will large quantities of pulp and albido be torn loose, but there is even danger of ripping through the rind and seriously injuring the hand of the operator. Or, if the fruit is not pressed down firmly enough, not all the juice will be extracted.

Accordingly it is the principal object of the present invention to provide a means of extracting the maximum juice from citrus fruit, with the minimum of bitter oils, pulp and albido, and without danger to the operator.

A further object is to provide a commercial juice extractor, which can be efficiently and safely operated by unskilled operators.

In addition to the foregoing objects, I have worked out a number of novel and useful details, which will be readily evident as the description progresses.

My invention consists in the novel parts, and in the combinations and arrangements thereof, which are defined in the appended claims; and of which two embodiments are exemplified in the accompanying drawing, which are hereinafter particularly described and explained.

Throughout the description, the same reference number is applied to the same member or to similar members.

Figure 1 illustrates one embodiment of my invention.

Figure 2 illustrates an alternative method of reciprocation.

Referring to Figure 1, it will be seen that 1 is a box, one side of which is shown cut away to expose the machinery within.

Mounted on top of this box are a series of bowls 2, with spouts 3. Only one of these is shown, the others being removed, so as to expose the shafts 4 and bearings of the reamer heads 5. Each of these heads has, preferably, eight ridges.

Each shaft 4 is mounted in a bearing 6 in the top of the box and a bearing 7 in the bottom of the box. Each shaft carries, about midway between its bearings, a gear 8.

Lengthwise of the box, there runs a rack 9, in mesh with the gears 8. Part of this rack is shown cut away, to expose one of the gears to view. Smooth untoothed ends 10 and 11 of the rack 9 slide in bearings 12 in the ends of the box.

A pitman 13 is swiveled in end 11 of the rack 9, and is driven by the flywheel 14 of the electric motor 15.

This flywheel is geared to rotate at a speed of about 1450 R. P. M., and it and the rack and the gears are so proportioned that each reciprocation of the rack causes approximately a 48° rotary vibration of the reamer heads.

I have found that if my machine is run at this rate of speed and with this degree of vibration, and a hemisphere of citrus fruit is held, flat side down, against one of the reamer heads, the juice will be extracted, with a minimum of bitter oils, pulp and albido.

I ascribe the success of the above dimensions and proportions to the following considerations, but do not wish to be bound thereby. The segmental wall of citrus fruit is approximately one radius in length. During reaming these segmental walls are caught by the ridges of the reamer-head, and laid in arcs against the circumference (i. e., the inner surface) of the rind. I have found that, if the distance through which a ridge of the reamer-head vibrates exceeds the length of one of the segmental walls of the fruit, the reaming process will rip the wall from the rind, which occurrence is one of the things which I am endeavoring to avoid.

Accordingly this consideration sets a limit of one radian (i. e. about 57°) to the allowable vibration of my reamer-head. On the other hand, the vibration cannot be much less than this and still extract the juice without undue pressure. Experiment has shown 48° to be just about right.

To leave no unreamed spaces, the central angle between successive ridges of the reamer-head must be less than, but not very much less than, the angle of vibration. Experiment has shown 45° (i. e., eight ridges in all) to be just about right.

The number of segments of the fruit appears to have no bearing on the problem. 1450 vibrations each way per minute has been found to be satisfactory. A speed considerably less than this (900 R. P. M.) has been found to produce juice too slowly and to hurt the wrist of the operator. A higher speed than 1450 R. P. M. would probably be satisfactory.

I have found that, with the above degree of vibration (48° more or less), even with a very high rate of vibration, no injury is possible to the operators' hands, even if the bare hands be held heavily against the vibrating reamer head, for the vibratory elasticity of the human flesh is greater than the distance through which the ridges of the reamer head vibrate.

Figure 2 shows a variant of Figure 1. In Figure 2 the rotary vibration of the reamer-head 5a is effected by means of a pitman 13a, directly connected from the flywheel 14a of the motor 15a to an arm 16 on the shaft 4a. The shaft 4a is set in bearings 6a and 7a. Reamers of this type can be rigged in gangs by an obvious extension.

I am, of course, aware of the fact that in the past there have been fruit reamers in which the head rotates in one direction in response to the downward pressure of the fruit on the head, and rotates in the reverse direction in response to the release of this pressure. But such a device contributed nothing to the solution of my problem; for, in the first place, the pressure necessary to operate the device, squeezes out some of the bitter oils; and, in the second place, the fact that juice extraction takes place only during rotation in one direction, results in tearing out the pulp and albido to some extent, as in the case of continuous rotation in one direction. Furthermore, for practical juice extraction on a large scale, it is necessary that the reamer heads be operated at a much higher speed than is possible by the pressure of the fruit; and none of the mechanical principles involved in the prior art device carry over into a separately operated device such as mine.

Having now described and illustrated one form of my invention, I wish it to be understood that my invention is not to be limited to the specific form or arrangement of parts hereinbefore described, except in so far as such limitations are specified in the appended claims.

In the claims, I use the words "motor" and "flywheel" to mean any independent power source—such as even a hand-crank—which can serve to reciprocate rapidly the rack 9 or the arm 16.

I claim:

1. In a reamer for citrus fruit, the combination of: a shaft; a reamer-head mounted on the shaft; a gear on that shaft; a rack meshing with the gear; a flywheel; a motor to rotate the flywheel; and a pitman pivoted to the rack and to the flywheel; the gear, the rack and the flywheel being so proportioned and positioned that the rotation of the flywheel gives to the reamer-head a rotary vibration of between 45° and 57°.

2. In a reamer for citrus fruit, the combination of: a shaft; a reamer-head mounted on the shaft; an arm projecting from the shaft; a flywheel; a motor to rotate the flywheel; and a pitman pivoted to the arm and to the flywheel; the arm, the pitman and the flywheel being so proportioned and positioned that the rotation of the flywheel gives to the reamer-head a rotary vibration of between 45° and 57°.

3. In a reamer for citrus fruit, the combination of: a ribbed reamer-head; and means to give to the reamer-head a rotary vibration of less than 57°, at a rate of more than 1000 complete vibrations per minute; the angle between successive ribs of the head being slightly less than the angle of rotary vibration.

4. In a reamer for citrus fruit, the combination of: a ribbed reamer-head; and means to give to the reamer-head a rotary vibration of less than 57°, the angle between successive ribs of the head being slightly less than the angle of rotary vibration.

5. In a reamer for citrus fruit, the combination of: a ribbed reamer-head; and means to give the reamer-head a rotary vibration of less than 57°, at a rate of more than 1000 complete vibrations per minute.

HENRY C. STEPHENS.